(12) United States Patent  (10) Patent No.: US 8,265,540 B2
Harada  (45) Date of Patent: Sep. 11, 2012

(54) DOCUMENT PRESSING APPARATUS, IMAGE READING APPARATUS AND IMAGE FORMING APPARATUS WITH DOCUMENT PRESSING APPARATUS

(75) Inventor: Hiroyuki Harada, Osaka (JP)

(73) Assignee: Kyocera Mita Corporation (JP)

( * ) Notice: Subject to any disclaimer, the term of this patent is extended or adjusted under 35 U.S.C. 154(b) by 490 days.

(21) Appl. No.: 12/556,633

(22) Filed: Sep. 10, 2009

(65) Prior Publication Data

US 2010/0061782 A1    Mar. 11, 2010

(30) Foreign Application Priority Data

Sep. 10, 2008  (JP) ................................. 2008-232612

(51) Int. Cl.
*G03G 15/00* (2006.01)
*G03G 15/04* (2006.01)

(52) U.S. Cl. ........ 399/377; 399/367; 399/379; 399/380; 358/474

(58) Field of Classification Search ................ 399/377
See application file for complete search history.

(56) References Cited

U.S. PATENT DOCUMENTS

| 5,574,542 A * | 11/1996 | Brook, III ...................... 399/380 |
| 6,405,017 B1 * | 6/2002 | Takahashi et al. ............ 399/380 |
| 7,672,636 B2 * | 3/2010 | Ono ................................ 399/380 |
| 7,676,189 B2 * | 3/2010 | Seo ................................. 399/380 |
| 8,027,069 B2 * | 9/2011 | Momose ........................ 358/497 |
| 2002/0191996 A1 * | 12/2002 | Nishikino et al. ............ 399/380 |
| 2004/0190961 A1 * | 9/2004 | Pyle et al. ..................... 399/380 |
| 2005/0025541 A1 * | 2/2005 | Terae et al. ................... 399/380 |
| 2006/0140693 A1 * | 6/2006 | Takami .......................... 399/377 |
| 2006/0245010 A1 * | 11/2006 | Kashimada ................... 358/474 |
| 2006/0291929 A1 * | 12/2006 | Ono et al. ..................... 399/367 |

FOREIGN PATENT DOCUMENTS

| JP | 63118148 A | * | 5/1988 |
| JP | 63298330 A | * | 12/1988 |
| JP | 02061632 A | * | 3/1990 |
| JP | 04056945 A | * | 2/1992 |
| JP | 05027339 A | * | 2/1993 |
| JP | 8-201935 | | 8/1996 |
| JP | 2000010212 A | * | 1/2000 |
| JP | 2004177932 A | * | 6/2004 |
| JP | 2006113496 | | 4/2006 |
| JP | 2008152185 | | 7/2008 |

* cited by examiner

*Primary Examiner* — Judy Nguyen
*Assistant Examiner* — Nguyen Q Ha
(74) *Attorney, Agent, or Firm* — Gerald E. Hespos; Michael J. Porco

(57) ABSTRACT

A document pressing apparatus is provided with a document pressing cover including a first lateral part and a second lateral part facing the first lateral part and openable and closable with respect to a housing fitted with a contact glass, a supporting member for supporting the document pressing cover rotatably with respect to the housing at the side of the first lateral part, a plate member connected with the document pressing cover for pressing a document against the contact glass, a first resilient member arranged at the side of the first lateral part between the plate member and the document pressing cover for exerting a pressing force to the document, and a second resilient member provided at the side of the second lateral part between the plate member and the document pressing cover for exerting a pressing force smaller than that of the first resilient member to the document.

12 Claims, 10 Drawing Sheets

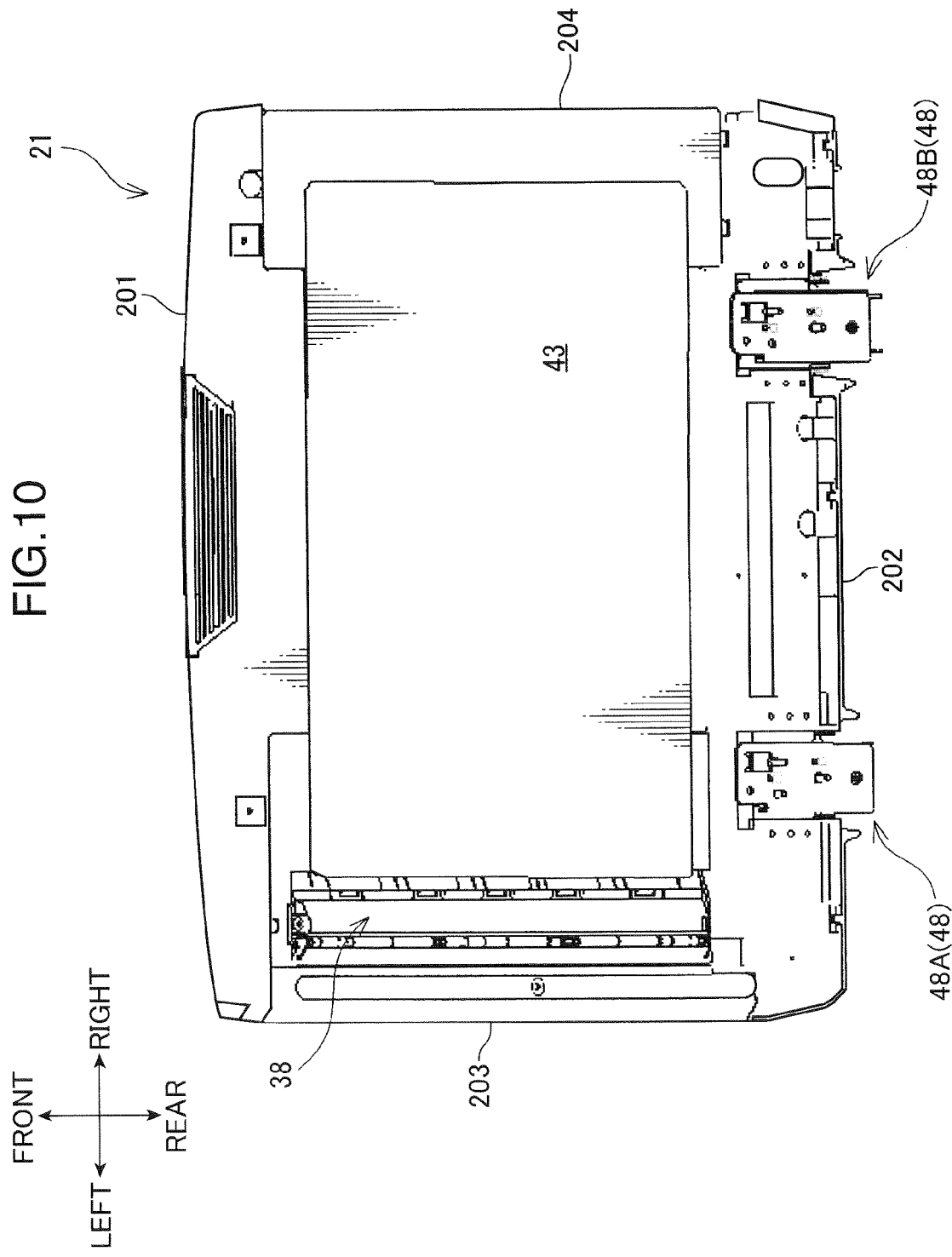

DOCUMENT PRESSING APPARATUS, IMAGE READING APPARATUS AND IMAGE FORMING APPARATUS WITH DOCUMENT PRESSING APPARATUS

BACKGROUND OF THE INVENTION

1. Field of the Invention

The present invention relates to a document pressing apparatus for pressing a document at a specified image reading position, an image reading apparatus and an image forming apparatus with this document pressing apparatus.

2. Description of the Related Art

An image forming apparatus for forming an image on a sheet based on a document image includes an apparatus body for performing an image forming operation, a document pressing apparatus and an image reader. Generally, the document pressing apparatus is rotatably supported on one end of a housing of the image reader. A document set on a contact glass of the image reader is pressed at an image reading position by the document pressing apparatus and an image plane thereof is optically read.

In an image forming apparatus employing an electrophotographic process, a photoconductive drum is charged beforehand and a laser beam modulated based on image data of a document image is irradiated to the outer surface of this drum to form an electrostatic latent image. Subsequently, a developed toner image is transferred and fixed to a sheet. Here, if the document is lifted up from the image reader, the image plane cannot be accurately read. Accordingly, technology for providing a document pressing apparatus with a cushion member has been disclosed (see, for example, Japanese Unexamined Patent Publication No. H08-201935).

According to this prior art, the thickness of the cushion member is gradually increased with distance from a position of rotation of the document pressing apparatus. Thus, the lift of the document can be prevented over the entire surface at the image reading position.

However, according to this prior art, a degree of adhesion between the document pressing apparatus and the image reader is excessively high and it is difficult for a user to open the document pressing apparatus after the image plane is read. Further, if the user opens the document pressing apparatus with vigor, there is also a problem that the image reader sticks to the document pressing apparatus and is lifted up together.

SUMMARY OF THE INVENTION

An object of the present invention is to provide a document pressing apparatus which can be easily opened while the lift of a document is prevented, an image reading apparatus and an image forming apparatus with this document pressing apparatus.

In order to accomplish this object, one aspect of the present invention is directed to a document pressing apparatus for pressing a document placed on a contact glass, including a document pressing cover including a first lateral part and a second lateral part facing the first lateral part and openable and closable with respect to a housing fitted with a contact glass; a supporting member for supporting the document pressing cover rotatably with respect to the housing at the side of the first lateral part; a plate member connected with the document pressing cover for pressing a document against the contact glass; a first resilient member arranged at the side of the first lateral part between the plate member and the document pressing cover for exerting a pressing force to the document; and a second resilient member provided at the side of the second lateral part between the plate member and the document pressing cover for exerting a pressing force smaller than that of the first resilient member to the document.

Another aspect of the present invention is directed to an image reading apparatus, including an image reader having a contact glass on which a document is to be placed and a housing for holding the contact glass; and a document pressing apparatus for pressing a document placed on the contact glass, wherein the document pressing apparatus has the above construction.

Still another aspect of the present invention is directed to an image forming apparatus, including an image reading apparatus for reading a document image; and an apparatus body including an image forming station for forming an image on a sheet based on data of a document image read by the image reading apparatus and adapted to support the image reading apparatus, wherein the image reader has the above construction.

BRIEF DESCRIPTION OF THE DRAWINGS

FIG. 10 is a plan view showing a lower side of a document pressing apparatus according to a modification.

DETAILED DESCRIPTION OF THE PREFERRED EMBODIMENTS

Figure 1:
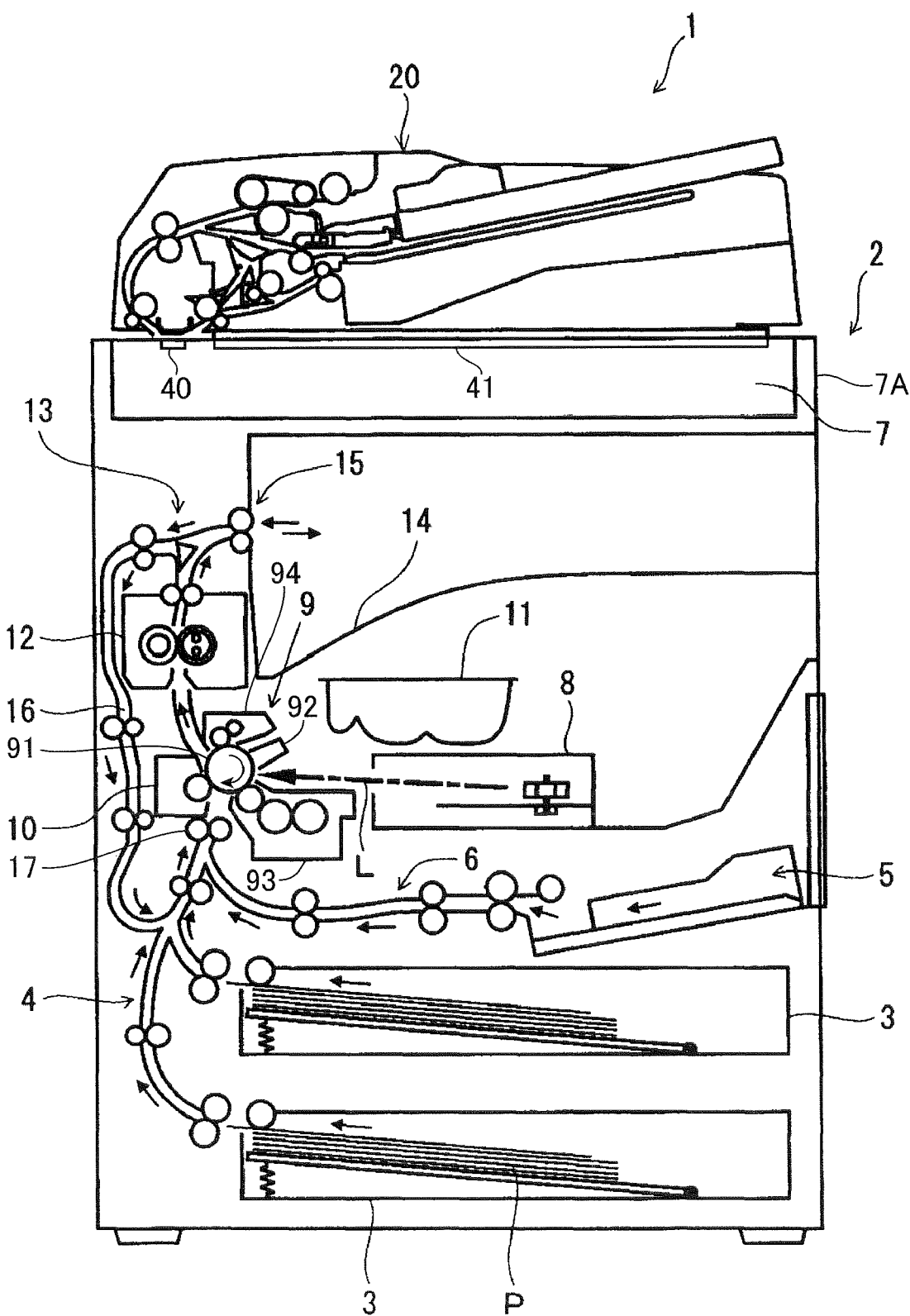
FIG. 1 is a front view in section schematically showing a multifunction peripheral as an example of an image forming apparatus according to one embodiment of the invention.

Hereinafter, embodiments of the present invention are described with reference to the accompanying drawings. FIG. 1 shows a cross section of a multifunction peripheral (MPF) 1 as an example of an image forming apparatus when viewed from front. The multifunction peripheral 1 of this embodiment is provided with an apparatus body 2 including an image forming station 9 for forming an image on a sheet, an image reader 7 arranged in an upper part of the apparatus body 2 and a document pressing apparatus 20 mounted on the upper surface of the apparatus body 2, i.e. above the image reader 7. The multifunction peripheral 1 is of the internal discharge type and a discharge tray 14 is formed below the image reader 7.

The document pressing apparatus 20 is a document feeder (ADF: Auto Document Feeder) which is so constructed as to be able to automatically feed a document to a specified image reading position. Specifically, when the multifunction peripheral 1 is used as a copier, a facsimile machine or a network scanner, a document is fed from this document pressing apparatus 20 to have an image plane thereof optically read by the image reader 7.

On the other hand, a front-loading sheet feeder is arranged in a bottom part of the apparatus body 2. Specifically, two sheet cassettes 3 are arranged in two upper and lower levels along a height direction of the apparatus body 2. The respective sheet cassettes 3 are both detachably mountable into the apparatus body 2. The interior of the sheet cassette 3 is open to the outside when the sheet cassette 3 is withdrawn toward the front side of the multifunction peripheral 1, whereas the interior of the sheet cassette 3 is closed when the sheet cassette 3 is pushed toward the back side of the multifunction peripheral 1.

Arrows shown in solid lines in FIG. 1 represent conveyance paths of sheets P and feeding directions thereof. One of various types of sheets P before image formation are stacked in each sheet cassette 3, and separated one by one from the cassette 3 to be fed leftward. The sheets P are fed upward along a conveyance path 4 provided along the left surface of the apparatus body 2.

An openable manual feed tray 5 is provided at the right surface of the apparatus body 2. A sheet fed from the manual feed tray 5 is fed in a conveyance path 6 and, thereafter, fed upward by the conveyance path 4.

In the apparatus body 2, registration rollers 17, the image forming station 9 and a transfer unit 10 are successively arranged downstream of the conveyance path 4 in a sheet feeding direction. The image forming station 9 includes a photoconductive drum 91 on the circumferential surface of which an electrostatic latent image and a toner image are to be formed, a charging unit 92 for uniformly charging the circumferential surface of the photoconductive drum 91, a developing unit 93 for developing the electrostatic latent image by supplying toner to the circumferential surface of the photoconductive drum 91 and a cleaning unit 94 for cleaning the circumferential surface of the photoconductive drum 91 after the transfer of a toner image.

An exposure unit 8 and a toner container 11 are arranged to the right of the image forming station 9. The exposure unit 8 includes a laser light source and a polygon mirror and irradiates a laser beam L modulated based on image data of a document image read by the image reader 7 toward the photoconductive drum 91 of the image forming station 9. The toner container 11 supplies toner to the developing unit 93. The transfer unit 10 includes a transfer roller held in contact with the photoconductive drum 91 to form a transfer nip and transfers a toner image formed on the circumferential surface of the photoconductive drum 91 to a sheet P passing the transfer nip.

A fixing unit 12 and a discharging/branching portion 13 are successively arranged downstream of the transfer unit 10 in the sheet feeding direction. The fixing unit 12 is for fixing the toner image to the sheet P by heating and pressing the sheet P having the toner image transferred thereto and includes a fixing roller and a pressure roller which form a fixing nip. The sheet P after the toner image transfer is heated and pressed by passing this fixing nip.

In the situation of printing one side of the sheet P, the sheet P discharged from the fixing unit 12 is discharged to the discharge tray 14 via discharge rollers 15. A duplex printing unit 16 is arranged between the discharging/branching portion 13 and the conveyance path 4. In the case of printing both sides of the sheet P, the sheet P discharged from the fixing unit 12 is returned to the conveyance path 4 by the duplex printing unit 16 and fed to the image forming station 9 again.

The image reader 7 includes a housing formed with an opening in its upper surface, a light source, an image pickup device and an optical system (not shown) accommodated in this housing. The light source is mounted in a movable frame and irradiates a document with light. The image pickup device includes a CCD (Charge Coupled Device) and the like, receives reflected light from the document and converts the received light into an electrical signal. The optical system includes a mirror and a lens and introduces the reflected light to the image pickup. A first contact glass 40 for automatic document reading by the ADF and a second contact glass 41 (contact glass as claimed) on which a document is manually placed for reading are fitted in the opening formed in the upper surface of the housing 7A.

Figure 2:
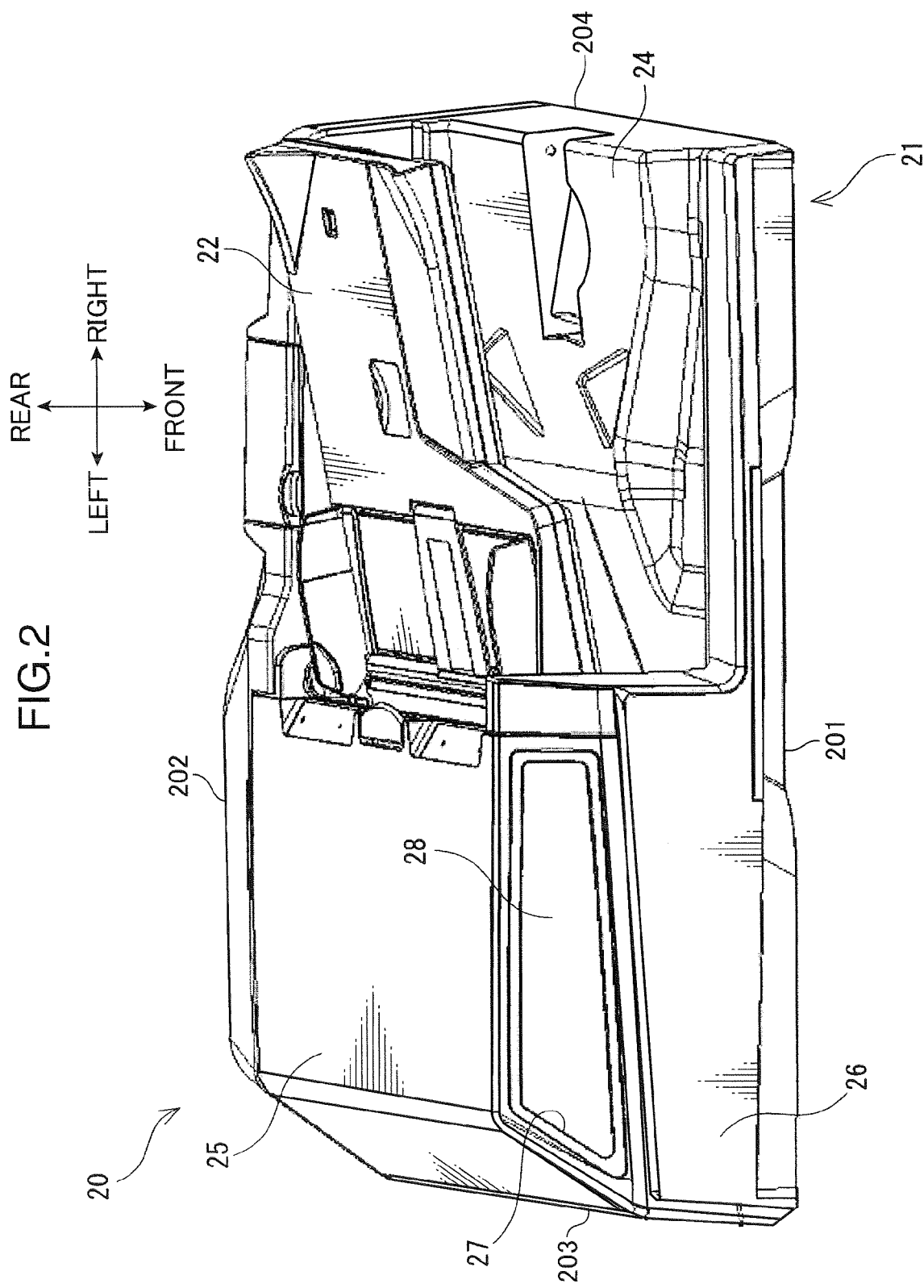
FIG. 2 is a perspective view of a document pressing apparatus.

FIG. 2 is a perspective view of the document pressing apparatus 20. The document pressing apparatus 20 includes a feeder body 21 (document pressing cover), a document tray 22 on which documents to have images thereof automatically read are to be placed, and a discharge tray 24 to which the documents are to be discharged. The feeder body 21 has a document automatic feeding function of discharging documents on the document tray 22 to the discharge tray 24 via the first contact glass 40 as a document image reading position.

The document tray 22 extends obliquely upward toward the right from a central part of the feeder body 21. The document tray 22 is rotatably mounted on the feeder body 21 in this central part. Documents to be automatically read at the position of the first contact glass 40 of the image reader 7 are set on this document tray 22. The discharge tray 24 is arranged at the back side of (below) the document tray 22.

The document pressing apparatus 20 roughly has a flat rectangular parallelepipedic shape and includes a front part 201 (second lateral part) located at the front side (side a user faces), a rear part 202 (first lateral part) facing the front part 201, and a left part 203 and a right part 204 orthogonal to these front and rear parts. Although described later, the document pressing apparatus 20 is rotatably supported on the housing 7A of the image reader 7 at the side of the rear part 202 and the posture thereof can be changed between an exposing posture for exposing the upper surface of the housing 7A and a covering posture for covering the upper surface of the housing 7A.

A projecting portion 26 (grip: see FIGS. 4 and 5) projecting forward is provided at a left side of the front part 201. The user lifts up the document pressing apparatus 20 while placing his or her hand on the lower surface of the projecting portion 26 upon changing the posture of the document pressing apparatus 20 from the covering posture to the exposing posture.

Figure 3:
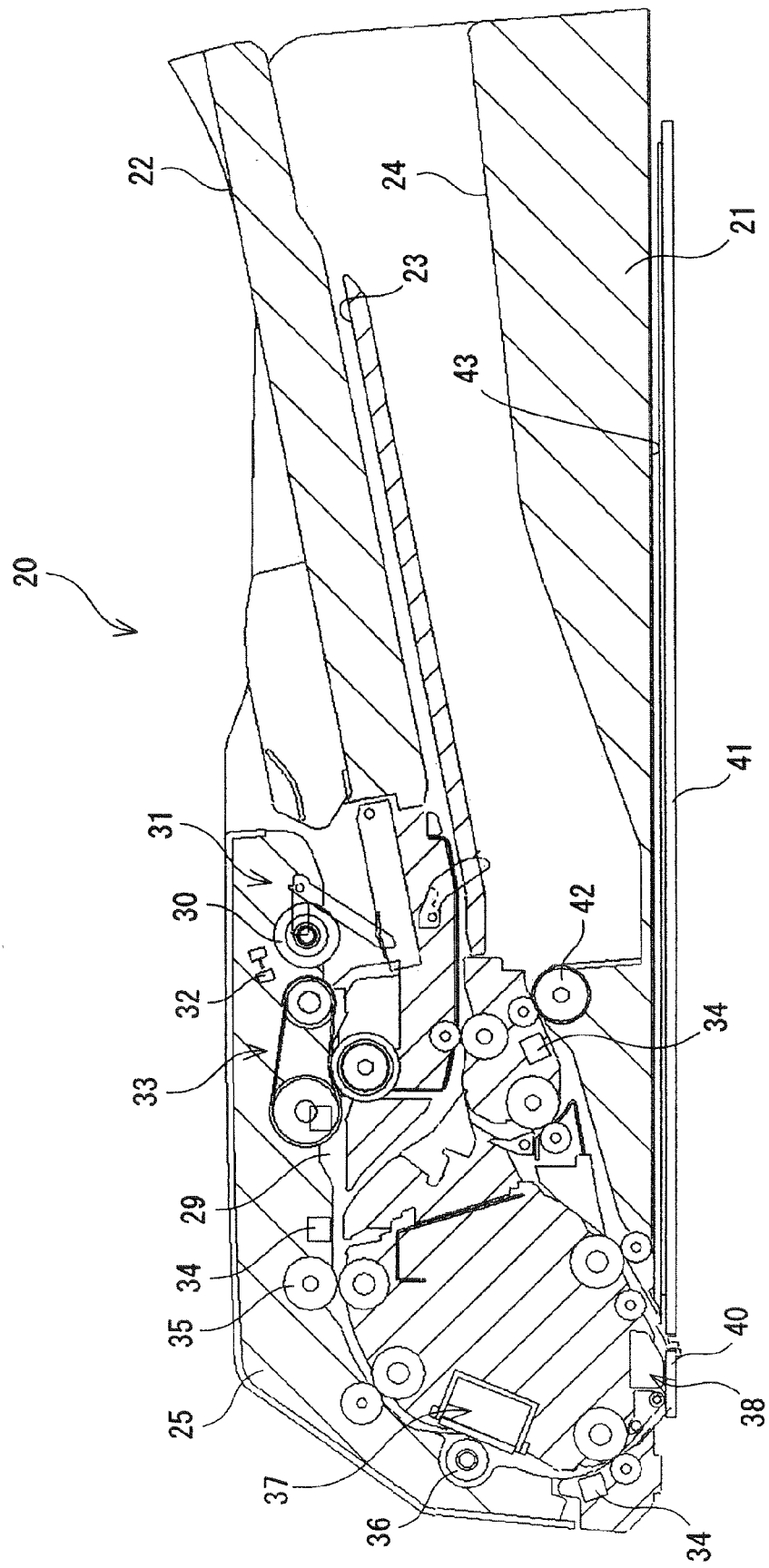
FIG. 3 is a front view in section of the document pressing apparatus.

The feeder body 21 includes a sheet cover 25 to the left of the document tray 22 (FIGS. 2 and 3). This sheet cover 25 is rotatably supported on the feeder body 21 at the left end of FIG. 2 and can open and close a conveyance path 29, in which documents are automatically fed, with respect to the outside. In other words, the cover 25 in a state shown in FIG. 2 closes the conveyance path 29, wherein the outer surface of the cover 25 corresponds to the ceiling surface of the feeder body 21 and, on the other hand, the inner surface thereof functions as a guide for the conveyance path 29.

Here, if the cover 25 is separated from the document tray 22 and rotated counterclockwise in FIGS. 2 and 3, the conveyance path 29 is opened and various rollers arranged around this conveyance path 29 can be exposed. Specifically, a pickup roller 30, a pair of separation rollers 33 and a registration roller 35 are successively arranged along this conveyance path 29 in a document feeding direction from the document tray 22.

The pickup roller 30 is mounted in the sheet cover 25 (FIG. 3) and held in contact with an uppermost document on the document tray 22 and feeds this document toward the pair of separation rollers 33. The feed of this document is detected by a set switch 31 and the orientation and the like of this document are detected by a position sensor 32. These set switch 31 and position sensor 32 are also mounted in the cover 25.

The pair of separation rollers 33 include one mounted in the sheet cover 25 and the other mounted in the feeder body 21, feed the documents one by one to the registration roller 35 at a specified conveyance pressure and to a contact sensor (CIS: Contact Image Sensor ) 37. The contact sensor 37 is mounted in the feeder body 21 near a supporting point of rotation of the sheet cover 25 to read the lower surface of the document, i.e. the surface at a side directly facing the document tray 22 in cooperation with a reading roller 36.

A sheet guide 38, a discharge roller 42 and a discharge tray 24 are successively arranged downstream of the contact sensor 37 in the document feeding direction. The sheet guide 38 is so mounted in the feeder body 21 as to face the first contact glass 40 of the image reader 7 arranged near the supporting point of rotation of the sheet cover 25. The document is fed between the sheet guide 38 and the first contact glass 40 and, at this time, an image on the upper surface of the document, i.e. on a surface opposite to the one read by the contact sensor 37 is read by the CCD via the optical system including the mirror and the lens in the image reader 7. The document having the image plane thereof read is discharged to the discharge tray 24 via the discharge roller 42.

Beside simultaneously reading the both sides of the document as described above, an image on each side may be successively read utilizing a reversing tray 23 arranged between the trays 22, 24. In other words, after having the upper side thereof read at the position of the first contact glass 40, the document is fed toward the reversing tray 23 located obliquely above to the right in FIG. 3 and reaches the reversing tray 23 with this upper side directly opposed to the reversing tray 23. Thereafter, when the document on this reversing tray 23 is switched back to the conveyance path 29 and fed obliquely upward to the left in FIG. 3, the lower side of the document is read at the position of the first contact glass 40.

In addition, the document pressing apparatus 20 includes a detection sensor 34 for detecting a document jam as shown in FIG. 3. Further, as shown in FIG. 2, a window 27 having a transparent or semitransparent transmitting member 28 fitted therein is formed at the front part 201. In this way, the user can see the conveyance path 29 even if the sheet cover 25 is closed.

Figure 4:
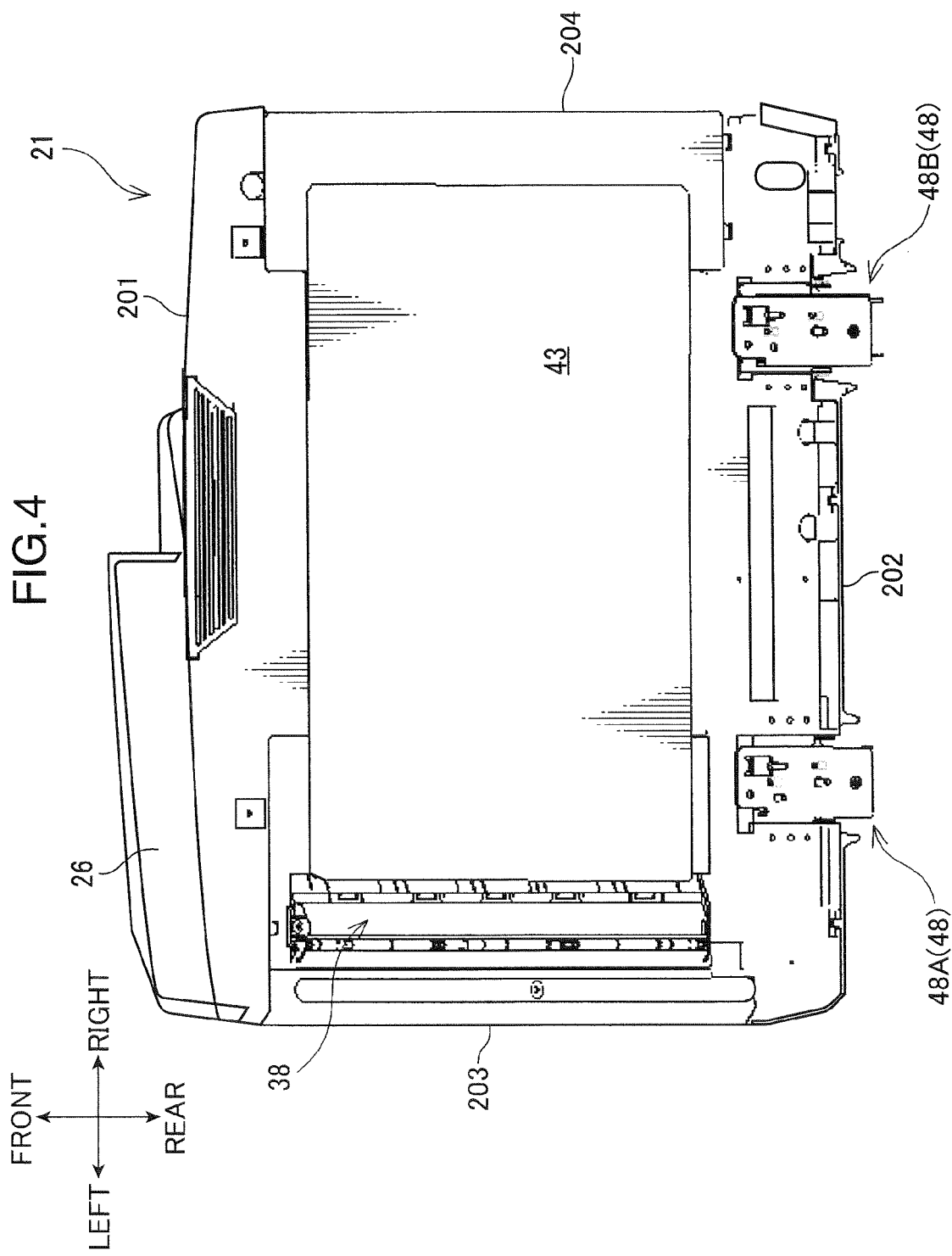
FIG. 4 is a plan view showing a lower side of the document pressing apparatus.

The document pressing apparatus 20 of this embodiment is rotatably supported on the apparatus body 2 via hinge units 48 (supporting member) at the rear part 202 on the rear surface of the multifunction peripheral 1 (FIG. 4). Thus, the document pressing apparatus 20 (feeder body 21) can be opened and closed with respect to the image reader 7. The user sets the feeder body 21 in the exposing posture while holding the projecting portion 26 upon setting a document on the second contact glass 41 for reading manually placed document, thereby exposing the second contact glass 41. Then, the document is placed on the second contact glass 41 and the feeder body 21 is set to the covering posture. Thereafter, an unillustrated operation button is pressed down to read an image plane of the document by the image reader 7.

A pressing plate 43 (plate member) made of resin is connected with the bottom surface of the feeder body 21. This pressing plate 43 is mounted at such a position as to face the second contact glass 41 (FIG. 3) when the feeder body 21 is in the covering posture. The document placed on the second contact glass 41 is pressed against the second contact glass 41 by the pressing plate 43 when the feeder body 21 is in the covering posture. Thus, a plane of the document to be read satisfactorily adheres to the second contact glass 41, so that precise image reading is performed.

Here, the pressing plate 43 of this embodiment is connected with the bottom surface of the feeder body 21 by a plurality of resilient members. Specifically, on the bottom surface of the feeder body 21, four first resilient members 49 (49A to 49D) for exerting specified pressing forces to the document and one second resilient member 50 for exerting a pressing force smaller than the pressing force of the first resilient members 49 to the document are so arranged as to be able to face the second contact glass 41 (FIG. 5).

Two first resilient members 49 are arranged at the side of the rear part 202 and two first resilient members 49 are arranged at the side of the front part 201 in such a range as to be able to face the second contact glass 41. Specifically, as shown in FIG. 5, one first resilient member 49A is arranged near the left hinge unit 48A and one first resilient member 49B is arranged also near the right hinge unit 48B. One first resilient member 49C is arranged also at the side of the front part 201 corresponding to this first resilient member 49B. Similarly, one first resilient member 49D is arranged also at the side of the front part 201 corresponding to the first resilient member 49A. In other words, the four first resilient members 49A to 49D are respectively arranged to correspond to four corners of the second contact glass 41.

The second resilient member 50 is arranged at the side of the front part 201 and near the projecting portion 26 (grip) in such a range as to be able to face the second contact glass 41. Here, the first resilient member 49D is also present near the projecting portion 26, but this second resilient member 50 is arranged closer to the peripheral edge of the pressing plate 43 (closer to the front part 201). In other words, the second resilient member 50 is arranged closer to the projecting portion 26.

Figure 5:
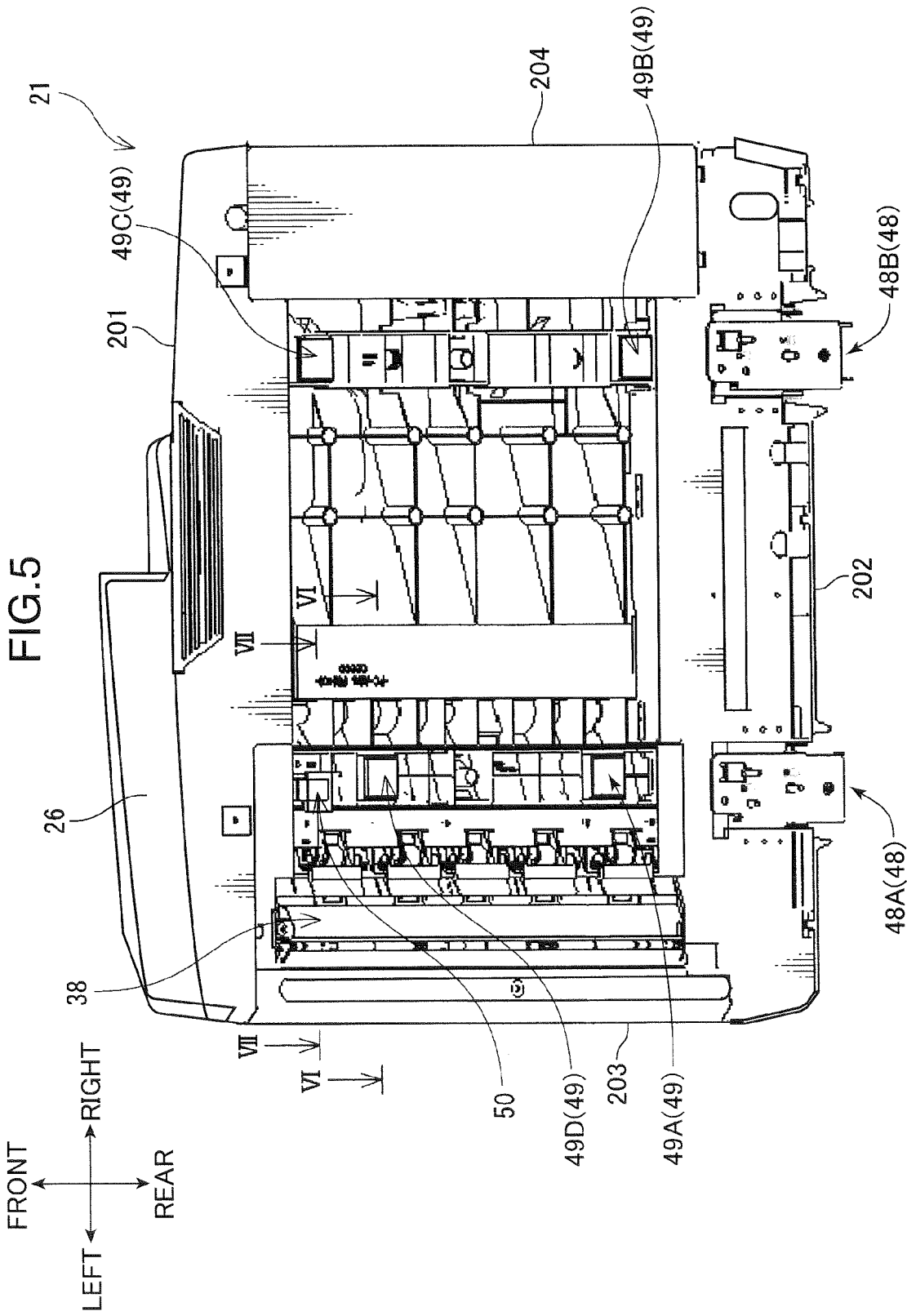
FIG. 5 is a perspective view showing a state where a pressing plate is detached from the document pressing apparatus of FIG. 4.
Figure 6:
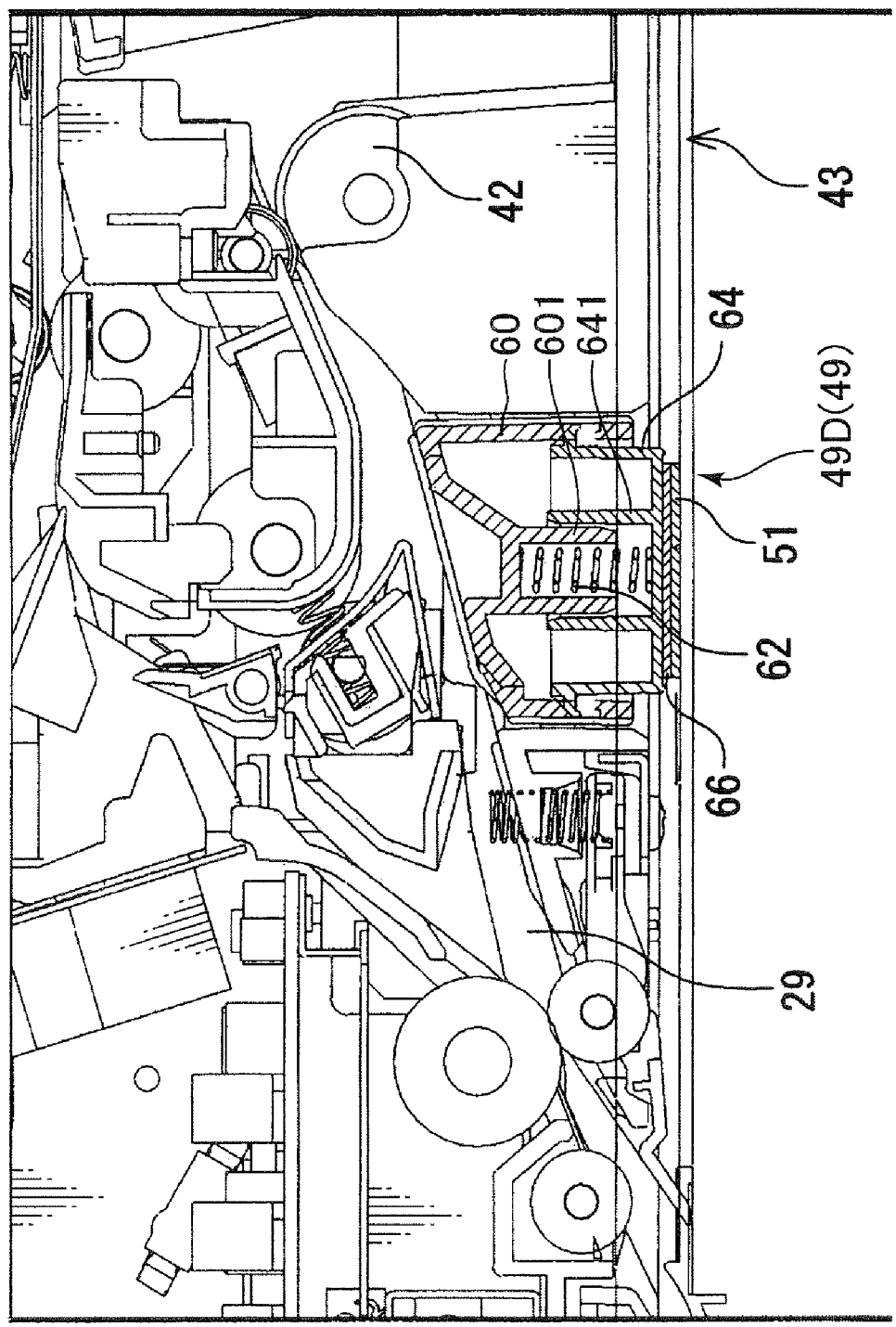
FIG. 6 is a section along VI-VI of FIG. 5.

FIG. 6 is a section along VI-VI of FIG. 5. The first resilient member 49D (49) includes a main frame 60, a spring 62, a pressing member 64 and a hook and loop fastener 66. The main frame 60 has an opening facing toward the pressing plate 43 and a hollow first boss portion 601 projecting inside this opening. This main frame 60 is fixed to the bottom surface of the feeder body 21 with the opening faced down. The pressing member 64 also includes an opening and a hollow second boss portion 641 projecting inside this opening. The inner diameter of the second boss portion 641 is larger than the outer diameter of the first boss portion 601, and the main frame 60 and the pressing member 64 are fitted by these boss portions. The spring 62 is disposed between the bottom surface of the first boss portion 601 and that of the second boss portion 641 to bias the pressing member 64 toward the pressing plate 43. The hook and loop fastener 66 is bonded to the lower surface of the pressing member 64.

Figure 7:
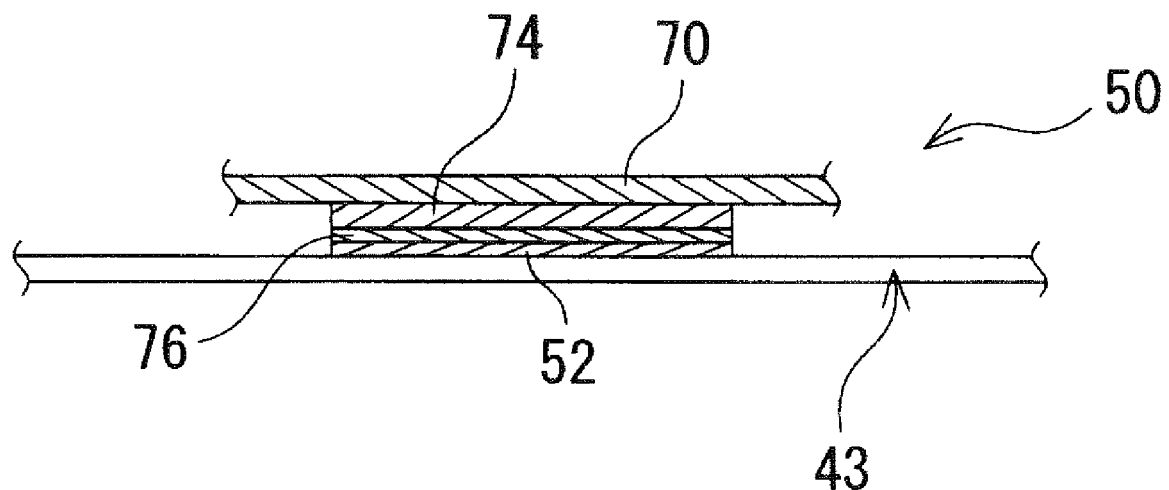
FIG. 7 is a section along VII-VII of FIG. 5.

FIG. 7 is a section along VII-VII of FIG. 5. The second resilient member 50 includes a planar frame 70, a sponge 74 and a hook and loop fastener 76. The frame 70 is fixed to the bottom surface of the feeder body 21. The sponge 74 is a member for generating an elastic repulsive force, and the upper surface thereof is bonded to the lower surface of the frame 70. The hook and loop fastener 76 is bonded to the lower surface of the sponge 74.

As described above, the first resilient members 49 include the springs 62 as members for generating pressing forces and the second resilient member 50 includes the sponge 74 as a member for generating a pressing force. Here, elastic forces generated by the springs 62 are stronger than that generated by the sponge 74, with the result that the pressing force generated by the second resilient member 50 is smaller than those generated by the first resilient members 49. Therefore, the first resilient members 49 press the pressing plate 43 more strongly.

Figure 8:
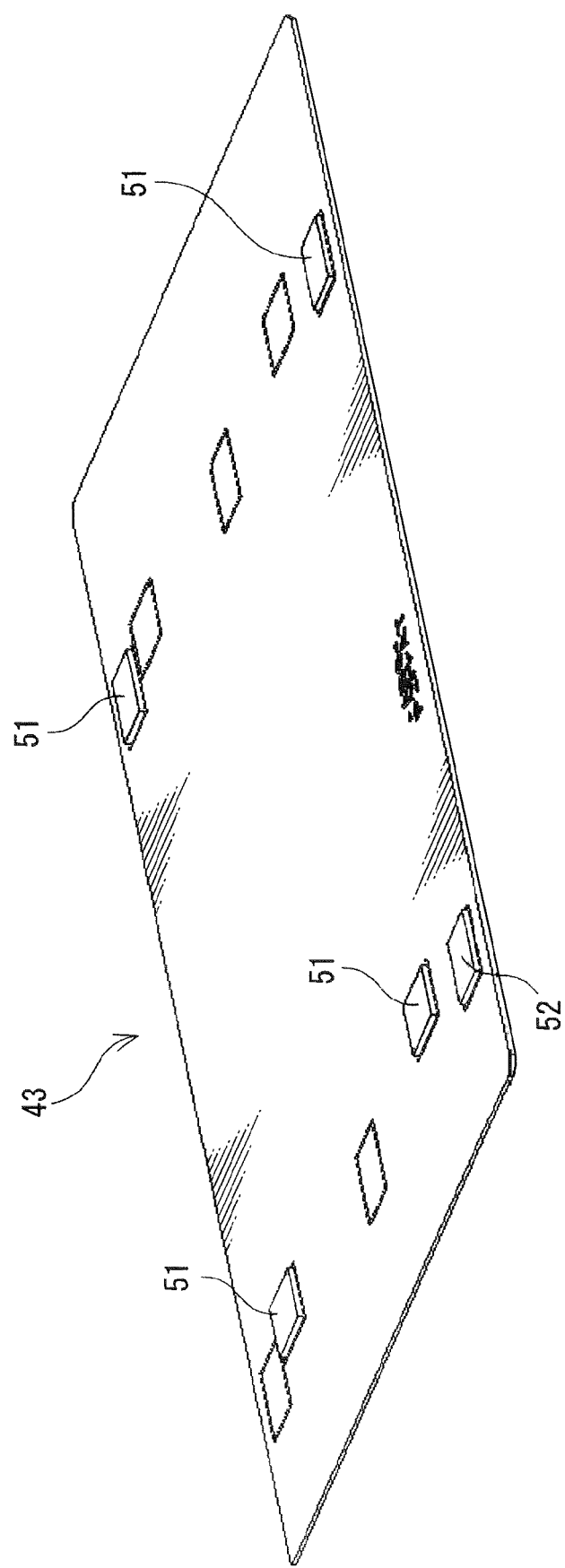
FIG. 8 is a perspective view of the pressing plate when viewed from above.

FIG. 8 is a perspective view of the pressing plate 43 when viewed from above. Four first hook and loop fasteners 51 and one second hook and loop fastener 52 are mounted on the upper surface of the pressing plate 43. The hook and loop fasteners 66 of the respective first resilient members 49 are engaged with the first hook and loop fasteners 51 and the hook and loop fastener 76 of the second resilient member 50 is engaged with the hook and loop fastener 52. By the respective engagements of these hook and loop fasteners, the pressing plate 43 is connected to the bottom surface of the feeder body 21.

Next, the operation of the multifunction peripheral 1 is described. In the case of manual copying, the user rotates the document pressing apparatus 20 (feeder body 21) to the exposing posture to set a document on the second contact glass 41. Thereafter, when the feeder body 21 is rotated to the covering posture, the set document is brought into contact with the pressing plate 43 and pressed against the second contact glass 41 by the weight of the feeder body 21, the pressing forces of the first resilient members 49 and the pressing force of the second resilient member 50. Subsequently, when the user presses a copy start button down, an image of the document is optically read by the image reader 7.

On the other hand, in the apparatus body 2, one sheet P is separated and fed from the sheet cassette 3 or the manual feed tray 5 in parallel with the above document reading operation and this sheet P reaches the registration rollers 17 in the apparatus body 2. The registration rollers 17 feed the sheet to the transfer unit 10 at a timing in conformity with toner image formation on the photoconductive drum 91 while correcting an oblique feed of the sheet P.

Further, based on image data from an unillustrated controller, the circumferential surface of the photoconductive drum 91 is irradiated with a laser beam L by the exposure unit 8. In this way, an electrostatic latent image of the document image is formed on the photoconductive drum 91 and, successively, developed by the developing unit 93. By this developing process, a toner image is formed on the circumferential surface of the photoconductive drum 91. This toner image is transferred to the sheet in the transfer unit 10.

Thereafter, the sheet P is fed to the fixing unit 12 while bearing the unfixed toner image, and the toner image is fixed to the sheet P. The sheet P discharged from the fixing unit 12 is discharged to the tray 14 via the discharging/branching portion 13.

In the case of performing duplex printing instead of simplex printing, the sheet discharged from the fixing unit 12 is returned to the duplex printing unit 16 immediately before being discharged to the tray 14. This sheet joins the conveyance path 4 and is fed toward the transfer unit 10 again. In this case, a toner image is transferred to the unprinted side of the sheet As described above, the document pressing apparatus 20 of this embodiment is provided with the feeder body 21, the hinge units 48 for rotatably supporting this feeder body 21 at the side of the rear part 202, the pressing plate 43, the first resilient members 49 and the second resilient member 50. When the feeder body 21 is rotated in a closing direction with respect to the image reader 7, the pressing plate 43 covers the upper surface of the image reader 7 while being pressed by the first and second resilient members 49, 50. Since the document is pressed against the second contact glass 41 by the pressing forces of the respective resilient members 49, 50, the lift of the document is prevented.

After the document is read, the user holds the projecting portion 26, lifts the feeder body 21 to set it to the exposing posture (by rotating it) and takes the document on the second contact glass 41 out. Here, the pressing force of the second resilient member 50 closest to the projecting portion 26 is set to be smaller than the pressing forces of the first resilient members 49. In other words, the pressing force near a part of the feeder body 21 to be first lifted up is set smaller than those in other parts.

Thus, when the feeder body 21 is rotated in an opening direction with respect to the image reader 7, a negative pressure between the pressing plate 43 near the second resilient member 50 having the smaller pressing force and the second contact glass 41 first disappears. Subsequently, a negative pressure between the pressing plate 43 near the first resilient members 40 (49D, 49C) and the second contact glass 41 disappears.

If the negative pressures are eliminated with a time delay in this way, the feeder body 21 can be opened with respect to the image reader 7 as if being turned over at the arrangement position of the resilient member 50. As a result, as compared to the conventional construction, i.e. such a construction that a degree of adhesion between the pressing plate and the contact glass increases, making it difficult to lift up the document pressing cover and the pressing plate and the contact glass stick to each other if this cover is lifted up with vigor, a force used to open the feeder body 21 with respect to the image reader 7, i.e. a force for lifting up the feeder body 21 can be reduced. Therefore, the operability of the feeder body 21 by the user can be improved.

Further, since the pressing plate 43 and the feeder body 21 are connected by the hook and loop fasteners 51, 52, 66 and 76, the pressing plate 43 can be easily detached from the feeder body 21. Thus, even if the pressing plate 43 is broken or smeared, it can be easily exchanged.

Further, the document pressing apparatus 20 with the ADF function generally has a weight of about 15 kg and a considerably large force is necessary to lift up this document pressing apparatus 20 from the image reader 7. However, by arranging the second resilient member 50 having the smaller pressing force closest to the projecting portion 26 to be griped by the user upon lifting up the document pressing apparatus 20, the degree of adhesion of the pressing plate 43 and the second contact glass 41 can be suppressed and the negative pressures can be instantaneously eliminated. Accordingly, the user can lift up the document pressing apparatus 20 with a small force and the document pressing apparatus 20 can be easily handled. Further, as a result of improving the handling of the document pressing apparatus 20, the multifunction peripheral 1 can be provided which can be used by many people regardless of handicap and age.

The present invention is not limited to the above embodiment and various changes can be made without departing from the claimed scope. For example, a plurality of second resilient members 50 having the smaller pressing force may be provided. Further, the document pressing apparatus is not limited to the ADF, and may be a plate-like document pressing apparatus.

Figure 9:
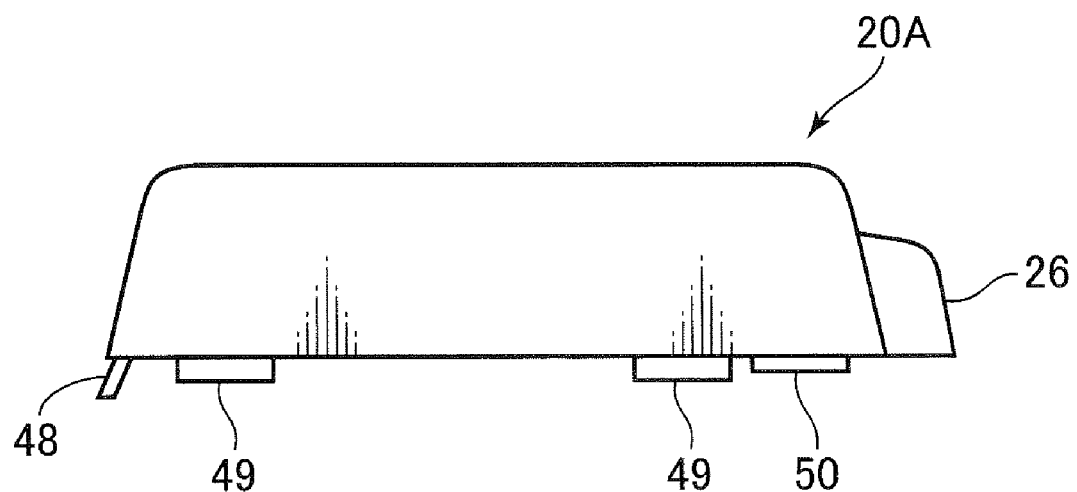
FIG. 9 is a diagram showing another embodiment of a resilient member.

Further, it is sufficient for the first and second resilient members to have different pressing forces and a pressing force adjusting method is not limited to the one for adjusting pressing forces by the types (springs 62 and sponge 74) of biasing members as in the above embodiment. For example, as shown in FIG. 9, the biasing members of both first and second resilient members 49, 50 may be sponges and the thickness of the second resilient member 50 may be set smaller than that of the first resilient members 49. Also in this case, similar to the above, a negative pressure between the pressing plate 43 near the thinner second resilient member 50 and the second contact glass 41 first disappears and then a negative pressure near the first resilient members 49 disappears.

Although the projecting portion 26 is formed at the front part 201 of the feeder body 21 in the above embodiment, it may not be present as shown in FIG. 10. In this case, the user changes the posture of the document pressing apparatus 20 from the covering posture to the exposing posture while holding a lower part of the front part 201 at a specified position. Even in this case, the pressing plate 43 can be turned over with the vicinity of one of the corners of the document pressing apparatus 20 as a starting point of eliminating negative pressures if one second resilient member 50 is arranged near the one corner of the second contact glass 41 at the side of the front part 201. Accordingly, even if the user lifts up the document pressing apparatus 20 while holding a transverse central part of the front part 201, negative pressures between the pressing plate 43 and the second contact glass 41 can be easily eliminated.

Further, although the multifunction peripheral 1 is shown as a specific example of the image forming apparatus in the above embodiment, the present invention is, of course, applicable to a copier, a printer or the like including a document pressing apparatus.

The above specific embodiment mainly embraces inventions having the following constructions.

A document pressing apparatus according to one aspect of the present invention includes a document pressing cover including a first lateral part and a second lateral part facing the first lateral part and openable and closable with respect to a housing fitted with a contact glass; a supporting member for supporting the document pressing cover rotatably with respect to the housing at the side of the first lateral part; a plate member connected with the document pressing cover for pressing a document against the contact glass; a first resilient member arranged at the side of the first lateral part between the plate member and the document pressing cover for exerting a pressing force to the document; and a second resilient member provided at the side of the second lateral part between the plate member and the document pressing cover for exerting a pressing force smaller than that of the first resilient member to the document.

According to this construction, when the document pressing cover is rotated in a closing direction with respect to an image reader, the plate member successively comes into contact with the document from the side of the first lateral part. When the plate member comes into contact with the document up to the side of the second lateral part, the document pressing cover is closed with respect to the image reader. At this time, since the plate member presses the document against the contact glass by the pressing forces of the first and second resilient members, the lift of the document is prevented.

Here, the pressing force of the second resilient member arranged at the side of the second lateral part is set smaller than that of the first resilient member. Thus, when the document pressing cover is rotated in an opening direction with respect to the image reader, a negative pressure between the plate member and the contact glass at the position of the second resilient member having the smaller pressing force first disappears and the document pressing cover can be opened with respect to the image reader as if being turned over from that position. As a result, a force required to open the document pressing cover with respect to the image reader can be reduced as compared with the prior art and the operability of the document pressing cover by a user is improved.

In the above construction, the thickness of the second resilient member may be set smaller than that of the first resilient member. According to this construction, a difference between the pressing forces of the first and second resilient members can be easily produced.

In the above construction, it is preferable to further comprise a hook and loop fastener for connecting the plate member with the document pressing cover. According to this construction, since the plate member can be easily detached from the document pressing cover, even if the plate member is broken or the like, it can be easily replaced.

In the above construction, one second resilient member is preferably arranged near one corner of the contact glass at the side of the second lateral part. In this case, it is further preferable to arrange the first resilient member near the other corner of the contact glass at the side of the second lateral part. According to this construction, the plate member can be turned over with the vicinity of the one corner of the contact glass where the second resilient member is arranged as a starting point, whereby negative pressures between the plate member and the contact glass can be more easily eliminated.

In the above construction, it is preferable that the first resilient member is arranged also at the side of the second lateral part; and that the second resilient member is arranged closer to the peripheral edge of the plate member than the first resilient member at the side of the second lateral part. According to this construction, negative pressures can be more satisfactorily eliminated, whereas the document can be entirely pressed by providing the first resilient member also at the side of the second lateral part.

In the above construction, it is preferable that a grip attached to the document pressing cover and used to open the document pressing cover is further provided; and that the second resilient member is arranged near the grip. According to this construction, since the second resilient member having the weak pressing force is arranged in a part closest to a position where a force for opening the document pressing cover is exerted, a negative pressure state can be instantaneously eliminated.

In this case, it is preferable that the first resilient member is arranged also near the grip; and that the second resilient member is arranged closer to the peripheral edge of the plate member than the first resilient member near the grip. According to this construction, negative pressures can be more satisfactorily eliminated, whereas the document can be entirely pressed.

Particularly, it is preferable that the first resilient member is arranged also at the side of the second lateral part, the grip is so attached to the document pressing cover as to be positioned near one corner of the contact glass with the document pressing cover closed; that two first resilient members are arranged at the side of each of the first and second lateral parts in correspondence with four corners of the contact glass; and that one second resilient member is arranged near the one corner of the contact glass where the grip is arranged and closer to the peripheral edge of the plate member than the first resilient member arranged in correspondence with the one corner.

In the above construction, it is preferable to include a document tray on which a document is to be placed, a discharge tray to which a document is to be discharged and an automatic document feeding mechanism for discharging a document on the document tray to the discharge tray via a document image reading position. Although a large force is generally necessary to lift up the document pressing apparatus having such an automatic document feeding function, the document pressing apparatus can be lifted up with a small force if the present invention is applied.

An image reading apparatus according to another aspect of the present invention includes an image reader including a contact glass on which a document is to be placed and a housing for holding the contact glass; and a document pressing apparatus for pressing a document placed on the contact glass, wherein the document pressing apparatus has the above construction.

An image forming apparatus according to still another aspect of the present invention includes an image reading apparatus for reading a document image; and an apparatus body including an image forming station for forming an image on a sheet based on data of a document image read by the image reading apparatus and adapted to support the image reading apparatus, wherein the image reading apparatus has the above construction.

According to this construction, in addition to the above functions and effects, the operability of the document pressing cover is improved, with the result that it is possible to construct an image reading apparatus or an image forming apparatus which can be used by many people regardless of handicap and age.

As described above, according to the present invention, it is possible to provide the document pressing apparatus which can improve the operability of the document pressing cover while preventing the lift of a document by setting a smaller pressing force of the second resilient member arranged at the side (second lateral part) opposite to a position of rotation of the document pressing cover (first lateral part), and an image reading apparatus or an image forming apparatus including this document pressing apparatus.

This application is based on Japanese patent application serial No. 2008-232612, filed in Japan Patent Office on Sep. 10, 2008 respectively, the contents of which is hereby incorporated by reference. Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A document pressing apparatus for pressing a document placed on a contact glass, comprising:
   a document pressing cover including a first lateral part and a second lateral part facing the first lateral part and openable and closable with respect to a housing fitted with a contact glass;
   a supporting member for supporting the document pressing cover rotatably with respect to the housing at the side of the first lateral part;
   a plate member connected with the document pressing cover for pressing a document against the contact glass, the plate member having first and second peripheral edges in proximity to the respective first and second lateral parts of the document pressing cover;
   first resilient members between the plate member and the document pressing cover for exerting a pressing force to the document, the first resilient members including at least one first resilient member at a side of the first lateral part and at least one first resilient member arranged at the side of the second lateral part; and
   a second resilient member provided at the side of the second lateral part between the plate member and the document pressing cover for exerting a pressing force smaller than that of each of the first resilient members to the document, the second resilient member being closer to the second peripheral edge of the plate member than the first resilient members.

2. A document pressing apparatus according to claim 1, wherein the second resilient member is thinner than that of each of the first resilient members.

3. A document pressing apparatus according to claim 1, further comprising a hook and loop fastener for connecting the plate member with the document pressing cover.

4. A document pressing apparatus according to claim 1, wherein the second resilient member is arranged near a first corner of the contact glass at the side of the second lateral part.

5. A document pressing apparatus according to claim 4, wherein one of the first resilient members is arranged near a second corner of the contact glass at the side of the second lateral part.

6. A document pressing apparatus according to claim 1, further comprising a grip attached to the document pressing cover and used to open the document pressing cover, wherein the second resilient member is arranged near the grip.

7. A document pressing apparatus according to claim 6, wherein:
   one of the first resilient members is arranged also near the grip; and
   the second resilient member is arranged closer to the peripheral edge of the plate member than the one of the first resilient members near the grip.

8. A document pressing apparatus according to claim 6, wherein:
   the grip is so attached to the document pressing cover as to be positioned near one corner of the contact glass with the document pressing cover closed;
   the first resilient members including two first resilient members arranged at the side of each of the first and second lateral parts in correspondence with four corners of the contact glass; and
   the second resilient member is arranged near the one corner of the contact glass where the grip is arranged and closer to the peripheral edge of the plate member than the first resilient member arranged at the side of the second lateral part in correspondence with the one corner.

9. A document pressing apparatus according to claim 1, further comprising:
   a document tray on which a document is to be placed;
   a discharge tray to which a document is to be discharged; and
   an automatic document feeding mechanism for discharging a document on the document tray to the discharge tray via a document image reading position.

10. An image reading apparatus for reading a document image, comprising:
    an image reader including a contact glass on which a document is to be placed and a housing for holding the contact glass; and
    a document pressing apparatus for pressing a document placed on the contact glass, wherein the document pressing apparatus includes:
    a document pressing cover including a first lateral part and a second lateral part facing the first lateral part and openable and closable with respect to a housing fitted with a contact glass;
    a supporting member for supporting the document pressing cover rotatably with respect to the housing at the side of the first lateral part;
    a plate member connected with the document pressing cover for pressing a document against the contact glass, the plate member having first and second peripheral edges in proximity to the respective first and second lateral parts of the document pressing cover;

first resilient members between the plate member and the document pressing cover for exerting a pressing force to the document, the first resilient members including at least one first resilient member at a side of the first lateral part and at least one first resilient member arranged at the side of the second lateral part; and a second resilient member provided at the side of the second lateral part between the plate member and the document pressing cover for exerting a pressing force smaller than that of each of the first resilient members to the document, the second resilient member being closer to the second peripheral edge of the plate member than the first resilient members.

11. An image forming apparatus, comprising:

an image reading apparatus for reading a document image; and an apparatus body including an image forming station for forming an image on a sheet based on data of a document image read by the image reader and adapted to support the image reading apparatus, wherein the image reading apparatus includes:

an image reader including a contact glass on which a document is to be placed and a housing for holding the contact glass; and a document pressing apparatus for pressing a document placed on the contact glass, wherein the document pressing apparatus includes:

a document pressing cover including a first lateral part and a second lateral part facing the first lateral part and openable and closable with respect to a housing fitted with a contact glass;

a supporting member for supporting the document pressing cover rotatably with respect to the housing at the side of the first lateral part;

a plate member connected with the document pressing cover for pressing a document against the contact glass, the plate member having first and second peripheral edges in proximity to the respective first and second lateral parts of the document pressing cover;

first resilient members between the plate member and the document pressing cover for exerting a pressing force to the document, the first resilient members including at least one first resilient member at a side of the first lateral part and at least one first resilient member arranged at the side of the second lateral part; and a second resilient member provided at the side of the second lateral part between the plate member and the document pressing cover for exerting a pressing force smaller than that of each of the first resilient members to the document, the second resilient member being closer to the second peripheral edge of the plate member than the first resilient members.

12. An image forming apparatus according to claim 11, wherein the document pressing apparatus includes:

a document tray on which a document is to be placed;

a discharge tray to which a document is to be discharged; and an automatic document feeding mechanism for discharging a document on the document tray to the discharge tray via a document image reading position.

* * * * *